Aug. 31, 1943. J. E. BALES 2,328,182
ARC WELDING TABLE
Filed Oct. 27, 1941 2 Sheets-Sheet 1
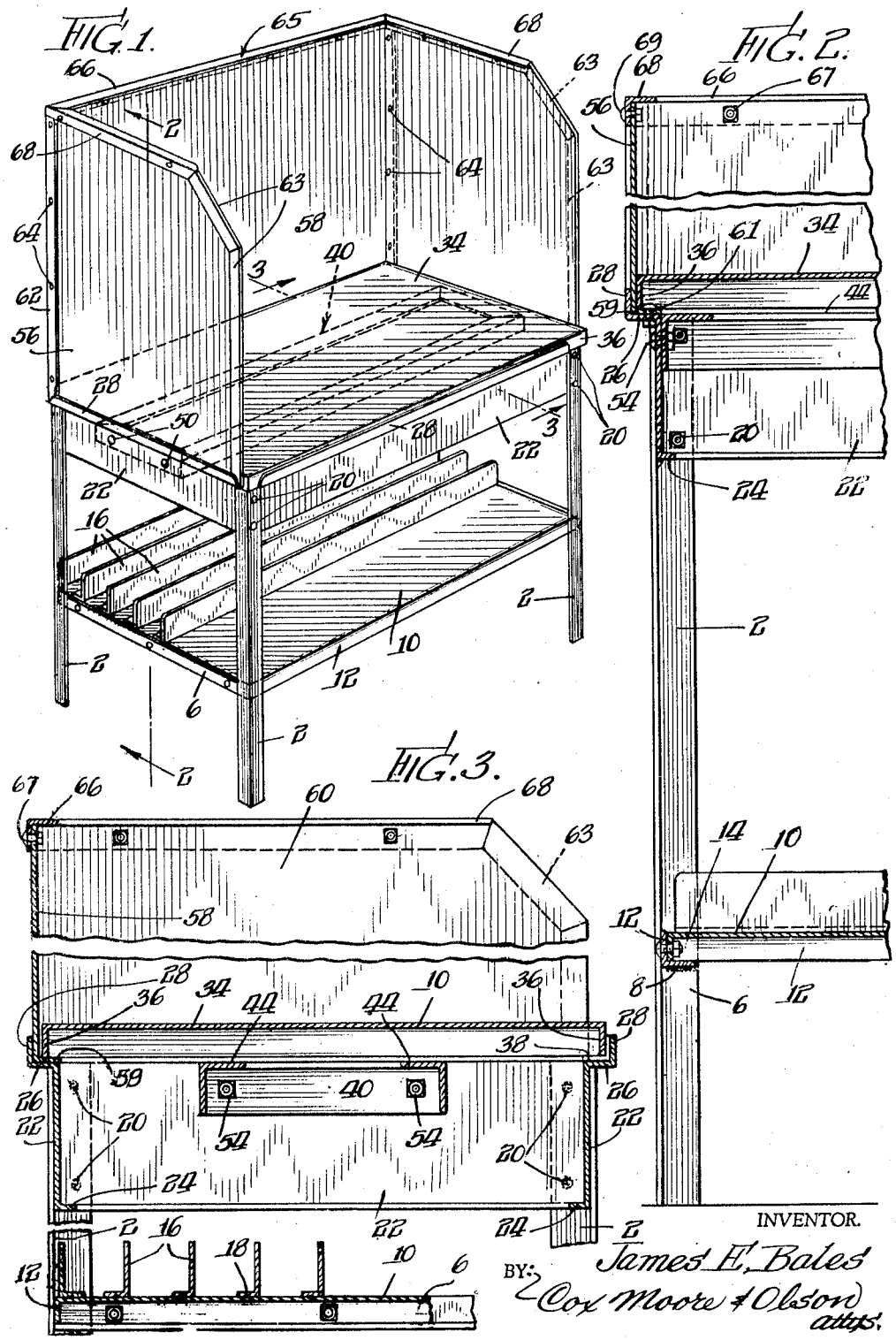
INVENTOR.
James E. Bales
BY Cox Moore & Olson
attys.

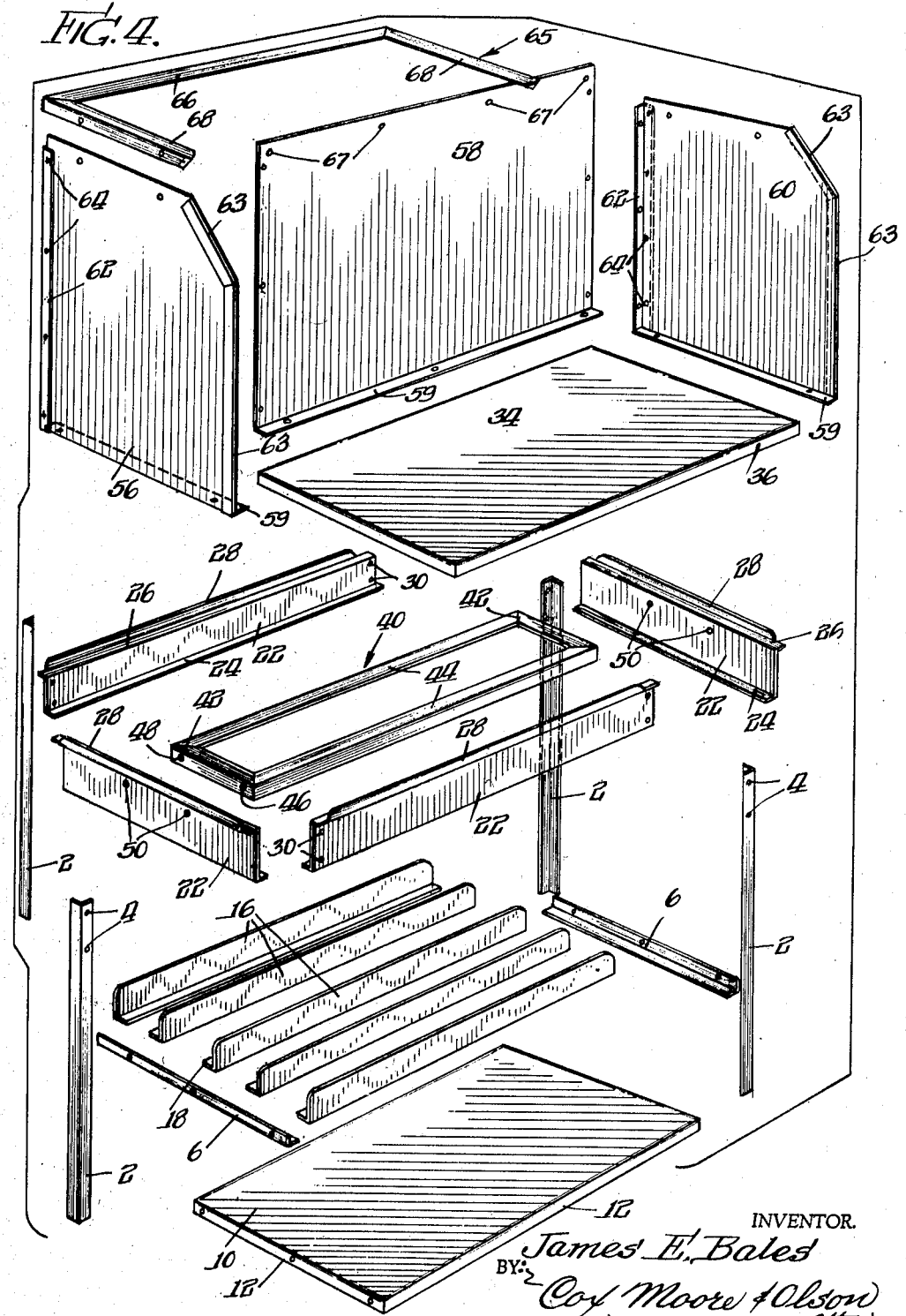

Patented Aug. 31, 1943

2,328,182

UNITED STATES PATENT OFFICE 2,328,182

ARC WELDING TABLE

James E. Bales, Aurora, Ill., assignor to Lyon Metal Products, Incorporated, Aurora, Ill., a corporation of Illinois Application October 27, 1941, Serial No. 416,766

2 Claims. (Cl. 311—105)

This invention relates to welding tables formed of metal.

Among the objects of the present invention is to provide a welding table of knock-down construction which may be encompassed within a small package, thereby saving in the freight charges, and which upon reaching its destination can be quickly assembled into a rugged, relatively light welding table.

Still another object of the invention is to provide a welding table which may be quickly converted from a gas-welding table to an electric-welding table.

Another object of the invention resides in providing a welding table made up of preformed standardized metallic parts including preformed lengths of angle iron and sheet metal.

Still another object of the invention resides in providing a welding table of the foregoing character which is provided with a shield or guard rail to protect the eyes of workers during the welding process.

Other objects of the invention will be apparent from a perusal of the following specification and the claims, when taken in connection with the drawings, wherein:

Figure 1 is a perspective view of the improved electric welding table;

Figure 2 is a section taken on the line 2—2 of Figure 1;

Figure 3 is a fragmentary longitudinal vertical section; and

Figure 4 is a view of all of the sheet metal parts of which the table is composed.

Referring now to the drawings in detail, my improved table is formed of four relatively short lengths of angle iron 2 which are provided with bolt holes 4 at their tops and near the bottom on the inside are provided with cleats 6, which cleats are welded thereto, as shown at 8 in Figure 2. Each cleat is provided with a horizontal flange upon which a lower shelf 10 of the table is adapted to rest.

This lower shelf is provided with a marginal downwardly depending flange 12, which has an inturned horizontal lip or flange 14 adapted to rest upon the horizontal flange of the cleat. In turn, the vertical flange 12 of the shelf abuts the vertical flange of the cleat so that the lower shelf is held rigidly in position and in turn forms a rigid interconnection between the four corner legs.

In the present instance I prefer to provide the upper surface with a plurality of sheet metal angle-shaped partitions or dividers 16, each comprising a vertical upstanding flange and a horizontal relatively shorter flange 18, which latter flanges are welded to the top surface of the shelf 10 so as to provide spaced apart partitions extending longitudinally preferably of the shelf 10. It is noted that these partitions leave a generous space at the front of the shelf adapted to receive blocks and weights used in the welding operation. The compartments between the upstanding dividers are for the storage of welding rods.

Disposed at the upper portion of the four legs and bolted to the inner faces thereof as at 20 are four sheet metal sides 22, each side having a lower inwardly extending horizontal flange 24 and an upper reversely horizontally extending flange 26, the upper portion of which terminates in a vertical flange 28. The front and rear pieces are suitably perforated as at 30 providing bolt holes for the attachment of each piece by the bolts 20 to the flange of the legs 2. The end side pieces are welded to the angle iron legs 2.

When the four legs and the side pieces are attached together a rigid box-like frame is provided for receiving the table top comprising in the present application a sheet metal top member 34 having marginal vertical depending flanges 36.

It is to be noted from Figure 3 that the vertical flanges 36 are spaced somewhat from the vertical flanges 28 of the side members to provide a pocket for the reception of the guard rail or shield hereinafter described.

A rigidifying member or frame 40 is provided comprising a hollow square-like structure formed of sheet metal angle irons suitably cut and welded together at the corners as at 42 to provide a hollow square, the upper face of which as at 44 is adapted to form a rigidifying support for the surface 34 of the table top.

End members of this support 40 as at 46 and 48 at the two ends are provided with bolt holes through which bolts pass to engage similar openings 50 in the end pieces 22. Bolts 54 pass through the bolt holes 46 and 48 of the end pieces of the hollow frame 40 and thence through the bolt holes 50 of the end pieces 22 to hold this rectangular brace rigid with the sides of the table so that the central portion of the table top 34 is thus rigidly supported.

The guard rail or shield is shown in Figures 1 and 4 as comprising three sheet metal plates 56, 58 and 60 suitably connected together along their vertical margins to provide a three-sided upstanding shield closed at the back and two sides of the table but open at the front. The lower edges of this L-shaped shield lie within the pocket formed between the vertical flange 28 of the side pieces and the vertical flange 36 of the table top. There is also a right angle flange 59 which underlies the lower edge 36 of the table 34 and is supported by the horizontal flange 26 of the side and end members 22. Bolts 61, as shown in Figure 2, connect the shield to the table top.

It will be noted that the side pieces 56 and 60 are provided on their back edges with reenforcing angle irons 62 and on their front edges with flat reenforcing bars 63. These reenforcing members are welded in place at 64 on each side plate 56 and 60.

In addition there is provided an upper angle iron frame member 65 having a back reenforcing portion 66 which is bolted to the back plate 58 at 67, and the frame 65 also having side members 68 which are bolted at 69 to reenforce the side members 56 and 60.

It will thus be seen that by means of the foregoing construction I have provided a very rugged, cheap, simple and effective knock-down sheet metal welding table which may be compactly shipped to avoid excessive freight charges and which upon arrival at its destination may be very quickly assembled in erect position.

It is to be noted that the welding table is formed of standardized preformed angle iron shapes and sheet metal parts which may be in part bolted together and in part welded for quick assembly, that the parts when so welded and bolted together rigidify and brace one another and that the table top itself is rigidly supported not only at its periphery but also at its central zone along the longer dimension of the top.

In addition, by the provision of the parallel spaced-apart flanges on the side members and the vertical flange portion of the table top itself I provide a pocket for the reception of the guard rail or shield, whereby the latter is attachably held in position, but which construction permits the ready removal of the guard rail if desired.

It is to be noted that a welding table of the above construction is peculiarly adapted for electrical welding in that it includes the metallic table top so necessary to use for electrical welding, but that by reason of the novel structure the electric welding table may be quickly converted to a gas type welding table, the features of construction of which are disclosed and claimed in a co-pending application filed by me.

Obviously the invention is not limited to the specific forms disclosed herein but is capable of other modifications and changes without departing from the spirit and scope of the claims appended hereto.

The invention is hereby claimed:

1. In a welding table, the combination of four vertically extending angle irons, the flanges of which are 90 degrees apart, said angle irons forming four vertically extending corner legs of the table, four vertically extending sheet metal panels having their outer ends connected to the flanges of said leg members, the upper portions of said panels providing horizontally extending ledges terminating in upwardly extending peripheral flanges, a sheet metal table top having marginal vertically extending flanges providing free edges, the latter flanges resting upon the horizontal flanges of the panel members and the vertically extending sides of the table top lying parallel to but spaced from the vertical flanges of said panel members and a guard rail comprising a back and two side sheet metal members interconnected, the lower edges of said back and two side members lying within the pocket or space formed between said parallel spaced-apart flanges of the panel member and the table top.

2. An electric welding table comprising four upright angle irons forming legs and having their flange portions substantially 90 degrees apart, a metal cleat welded to the inner vertical wall of each angle iron substantially above the base of said legs and having a horizontal wall and a vertical wall, a horizontal shelf member of sheet metal having vertically depending peripheral flanges forming free edges, said free edges lying upon the horizontal wall of the cleat member and the vertical wall of the flange snugly fitting the inner vertical wall of the cleat member, means forming a top for said table, said table top rigidly interconnected with the upper portions of said legs and means for storing welding rods in parallelism comprising a plurality of L-shaped sheet metal members having their shorter flanges welded to the top of said shelf, the longer vertical legs of said L-shaped sheet metal members extending upwardly in spaced relation from said shelf whereby to form partition means and whereby to rigidify the shelf.

JAMES E. BALES.